Dec. 29, 1936.  W. HUGHES  2,066,111
REGISTER FOR DISTRIBUTORS OF IGNITION SYSTEMS
Filed May 2, 1935  3 Sheets-Sheet 1

Inventor
Wilker Hughes
By
Attorney

Dec. 29, 1936.     W. HUGHES     2,066,111
REGISTER FOR DISTRIBUTORS OF IGNITION SYSTEMS
Filed May 2, 1935     3 Sheets-Sheet 2
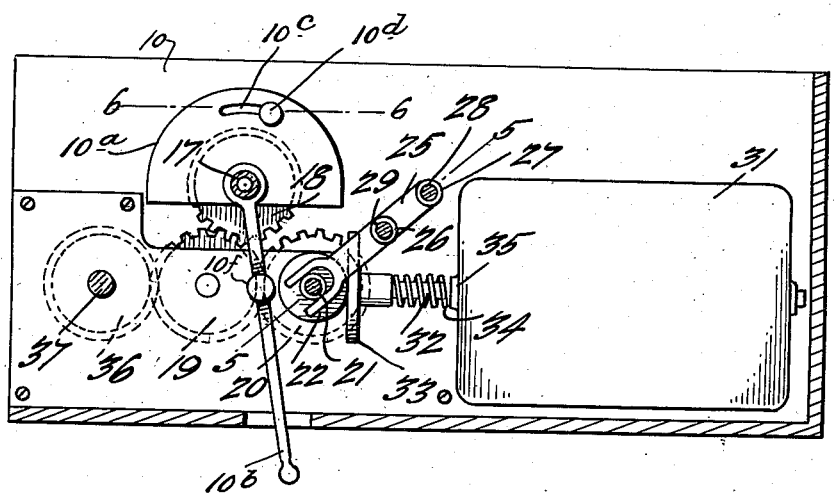
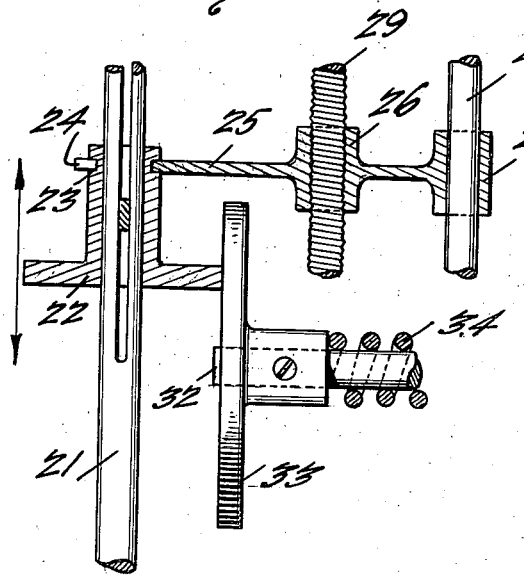
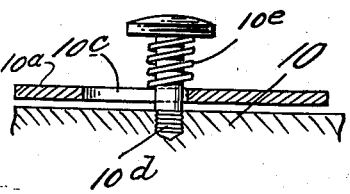
Inventor,
Wilber Hughes,
By
Attorney Dec. 29, 1936.  W. HUGHES  2,066,111
REGISTER FOR DISTRIBUTORS OF IGNITION SYSTEMS
Filed May 2, 1935  3 Sheets-Sheet 3
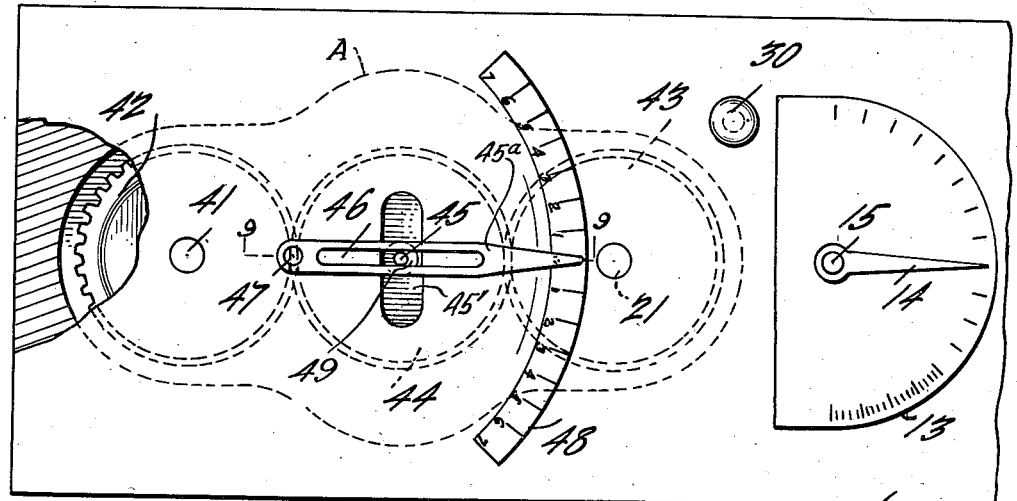
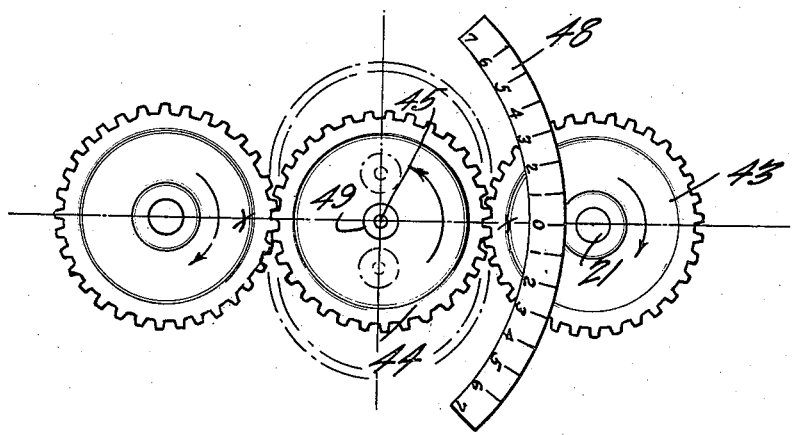
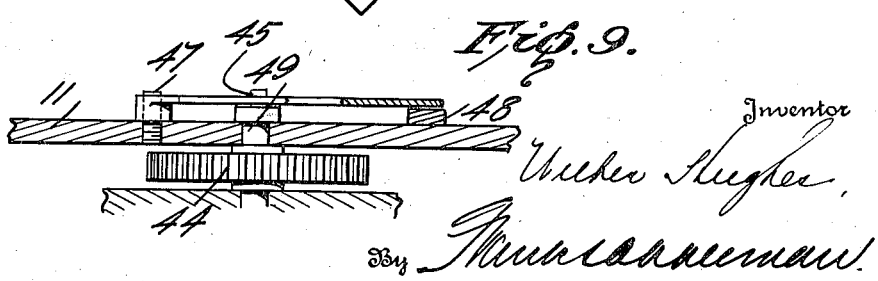

Patented Dec. 29, 1936

2,066,111

UNITED STATES PATENT OFFICE 2,066,111

REGISTER FOR DISTRIBUTORS OF IGNITION SYSTEMS

Wilber Hughes, Crow Summit, W. Va.

Application May 2, 1935, Serial No. 19,537

2 Claims. (Cl. 73—51)

This invention relates to a device for testing and adjusting distributors for internal combustion engines, and an object of the invention is to provide mechanism by which the time or times the spark is delivered for igniting the charge in the cylinder is determined, in order that the timing of the spark may be controlled with relation to the compression stroke of the engine; it being the purpose of the inventor to control the distribution of the spark and make it synchronous with the speed of operation of the engine.

It is well known that in the operation of internal combustion engines, the time of creating the spark or the firing of the charge differs or should differ in relation to the position of the piston and according to the rate of speed of the engine, and the time of the firing should be advanced or retarded automatically accordingly in exact ratio to the advanced or retarded speed.

The purpose of this instrument is to determine to what extent a distributor retards or advances the time of firing as the speed of the engine increases or diminishes.

It is a further object of this invention to provide novel means for mounting the distributor to be tested in operative relation to driving mechanisms whose speed may be changed at will in order that the effect of the different speeds may be registered for observation.

It is a still further object of this invention to provide mechanism of the character indicated which can be manually controlled and which is of a comparatively simple and inexpensive nature that has proven efficient and satisfactory in use.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 4 illustrates a sectional view on the line 4—4 of Fig. 1;

Figure 5 illustrates an enlarged detail view of part of the mechanism, partly in section;

Figure 6 illustrates an enlarged detail view of an adjusting means for one of the gears;

Figure 7 illustrates a top plan view of the device, partly in section, parts being omitted;

Figure 8 illustrates a plan view of the registering mechanism; and

Figure 9 illustrates a vertical sectional view through a central part of the mechanism shown in Figure 8.

Figure 1:
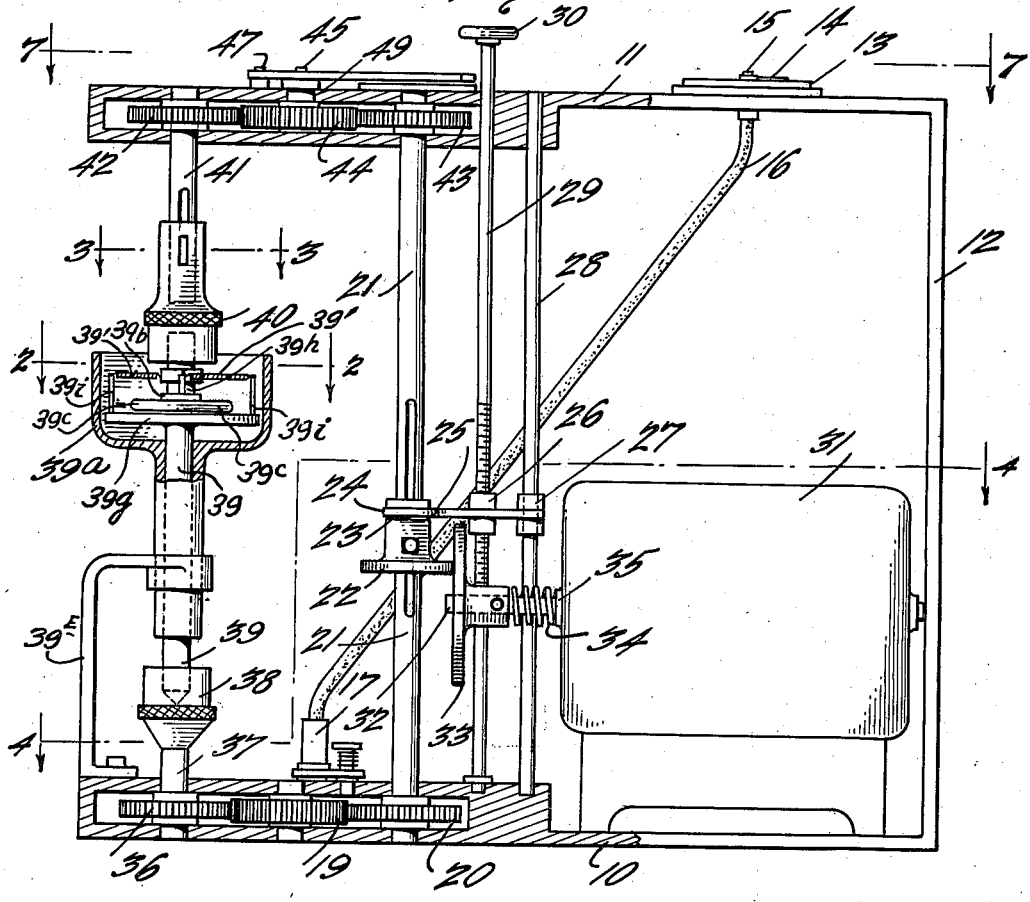
Figure 1 illustrates a view in elevation partly in section showing one embodiment of the invention.

In these drawings, any suitable frame structure may be provided in which a base 10 and a head 11 are used, here shown as being connected by a standard 12. The head may be provided with a speedometer dial 13 with relation to which a pointer 14 is movable, the said pointer being attached to the speedometer shaft 15, it being understood that the speedometer may be of any appropriate type. A flexible shaft 16 for driving the speedometer leads to and is connected to a shaft 17 of a gear wheel 18, the shaft 17 being journaled in appropriate bearings in the housing 10$^a$, which housing is adjustable on the base under the influence of the lever 10$^b$ in order that the gear wheel 18 may be made to mesh with the gear wheel 19 or the gear wheel 20 according to the direction of movement of the lever 10$^b$. The housing has a slot 10$^c$ into which a screw 10$^d$ extends, the said screw being anchored in the base 10. A spring 10$^e$ on the screw bears against the lever 10$^b$ and holds the housing at different positions of adjustment. The lever 10$^b$ is mounted on a pivot 10$^f$. The gear wheel 20 is secured to a shaft 21 which extends vertically and it is journaled in appropriate bearings in the base and head. The shaft 21, in the present embodiment of the invention, is provided with a friction wheel 22, which wheel is splined on the shaft 21 and it has a range of movement vertically of said shaft 21. The friction wheel has a groove 23 and the bifurcated end 24 of an arm 25 is seated in the groove. The arm 25 has an internally threaded boss 26 between its ends and an apertured boss 27 at the end opposite the bifurcation. The apertured boss 27 is slidable on a guide rod 28 which is held in appropriate way between the base and head and a screw threaded rod 29 is applied to the threaded boss 26 and it may be rotatably mounted in appropriate bearings in the head and base, the said rod projecting above the head and being provided with a hand grasp 30, such as a wheel, crank or the like. It is obvious from an inspection of the drawings and the foregoing disclosure that rotation of the rod 29 will result in moving the arm 25 vertically and that the friction wheel 22 will be carried with it.

A motor 31, preferably electrically driven, is provided with an armature shaft 32 on which a friction disk 33 is preferably splined so that the friction disk will rotate with the armature shaft and have movement axially of said shaft, the foregoing being for the purpose of permitting a spring 34 on the armature shaft to be interposed between the hub of the disk 33 and an abutment 35 on a casing of the motor to yieldingly hold the friction disk in engagement with the periphery of the friction wheel and obviously, as the friction wheel is moved vertically to encounter the friction disk at different locations on its surface, the R. P. M. of the wheel will be increased or diminished.

The purpose of having the gear wheel 18 adjustable to engage the gear wheels 19 or 20 selectively is to provide for the operation of the mechanism in association with distributors of different types, that is to say, whether they are driven clockwise or anti-clockwise when they are installed in association with the internal combustion engine which they are to serve. The gear wheel 19 is in mesh with a gear wheel 36 which has a relatively short stub shaft 37, the upper end of which is provided with an open bearing or chuck 38 in which the lower end of the distributor shaft 39 is seated so that it may rotate with the chuck. Distributors 39ª have controlling means which operate under the influence of centrifugal force and one such distributor having springs and weights is illustrated conventionally in Figure 2, but as they are well known mechanical details, it is believed unnecessary to describe them specifically. The upper end of the distributor shaft is connected to a chuck 40 splined to the shaft 41 which is journaled in suitable bearings in the head and a gear wheel 42 is secured to the shaft 41.

Figure 2:
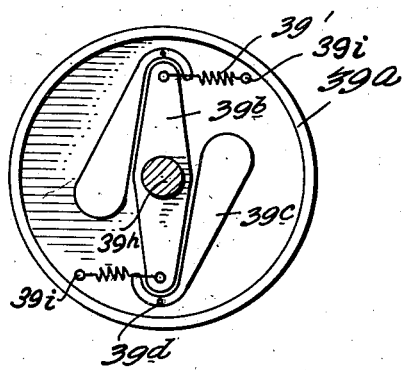
Figure 2 illustrates a sectional view of the distributor taken on the line 2—2 of Figure 1.
Figure 3:
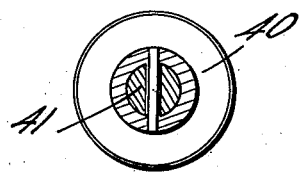
Figure 3 illustrates a sectional view on the line 3—3 of Fig. 1.

The distributor shown in Figures 1 and 2 is provided with a shaft 39 on the upper end of which a disk 39ᵍ is fixed. A cross member 39ᵇ is carried by a short shaft 39ʰ which projects upwardly from the cross member, the said cross member or arm being under the influence of oppositely disposed springs 39' at its opposite ends, said springs being attached to pins 39ⁱ, and the cross member is engaged at its ends by governor weights 39ᶜ each having a curved end embracing the end of the cross member or arm and as each governor weight is oscillatable on a pivot 39ᵈ when the said governor weight swings outwardly under the influence of centrifugal force, the hooked end of the weight will serve to exert force counter to the pull of the springs so that the shaft 39ʰ of the distributor is turned with respect to the shaft 39 under the influence of centrifugal force to an extent dependent upon the R. P. M. of the shaft 39. The shaft 39ʰ rotates the gear wheel 42 through the chuck 40.

The distributor 39ᵃ is supported and held stationary by a bracket 39ᵉ which bracket is shown as being supported by the base 10 and it may be connected to the distributor in any appropriate way.

The chuck 40 is turned by the cam shaft of the rotor. This chuck is set so that the gears are in straight alinement as in Figure 8 and run in unison at the beginning of the test.

A gear wheel 43 is secured on the shaft 21 near its upper end within the head and it meshes with a floating gear wheel 44, which floating gear wheel is also in mesh with the gear wheel 42. The gear wheel 44 has a projecting pin 45 which passes through a slot 46 of an indicator or pointer, it being shown that the said pointer is oscillatably mounted on a pivot 47, whereas its other end is free to move in conjunction with a scale 48 on the upper surface of the head and, as will be presently explained, when the floating gear wheel 44 moves transversely of the axis of the shafts 21 and 41, the indicator will be moved with relation to the scale for determining the timing of the spark because, if the cross member 39ᵇ rotates with respect to the disk 39ᵍ, then the gear wheel 42 will rotate with respect to the gear wheel 36 and, since the wheels 20 and 43 must rotate in unison, the retardation or advance of the gear 42 with respect to the gear 36 will cause the floating gear to shift position in correspondence to the extent of retardation or advance. Then, if the scale 48 be graduated for normal advance or retardation at definite speeds, any variation of the retardation or advance from normal will be indicated on this scale by the pointer 45ᵃ assuming a position other than that which is normal for the speed (R. P. M.) of the distributor under test. The upper plate of the head has a slot 45' in which the guide 49 of the gear wheel 44 may move, thus providing clearance for the range of action of the said floating gear wheel, it being shown in dotted lines at A in Fig. 7, that the central part of the opening in the head in which the gear wheels are mounted is wider than at the ends, thus affording a clearance for the movement of the said gear wheel 44.

As has been generally stated, the purpose of the instrument is to show to what extent the distributor retards or advances the time of firing as the speed of the engine increases or decreases. It is obvious that if the gear wheels 42 and 43 were rotating at uniform and corresponding R. P. M. and a mark such as "x" is applied to each near its periphery, the "x" marks would arrive opposite each other on each rotation of the wheels, but if by proper operation of the distributor the gear wheel 42 were retarded slightly, such marks would vary in time of arrival at the opposed points described in the first example and if such variation were registered, it would reveal the measure of accuracy and efficiency of the timing.

It is understood that there is no shaft for the gear wheel 44 as it floats freely between the wheels 42 and 43 and that at equal speeds all of the gear wheels 42, 43 and 44 will be in alinement.

An operator may obviously change the position of the friction wheel at will for increasing or diminishing the R. P. M. of the trains of gearing and the speedometer will be used for registering the different speeds, and the operator may then determine the action of the distributor at the different speeds and by this checking of the mechanism correctly set the distributor that it may advance or retard the spark to suit it for the particular engine which it is serving.

I claim:

1. In means for registering the timing of a distributor, the combination of means for rotating the rotatable parts of a distributor, means for varying the R. P. M. of the rotating means, means for registering the speed of the rotating means, and means for indicating the advance or retardation of spark producing instrumentalities of the distributor in comparison with the speed, said means comprising a gear wheel rotatable through the distributor, a floating gear wheel meshing therewith and a gear wheel rotated by the driving means engaging the floating gear wheel, a pivotally mounted indicator, and means for communicating the motion of the floating gear wheel to the said indicator.

2. In means for registering the timing of a distributor, the combination of a motor, a driving disk rotatable thereby, a friction wheel engaging the driving disk, a shaft on which the friction wheel is splined, an arm operative to move the friction wheel, a screw threaded through the arm and operative to move the arm axially of the shaft, a guide for the arm, means for communicating the motion of the shaft to a distributor shaft, a gear wheel rotated through the distributor shaft, a floating gear wheel meshing therewith, a gear wheel on the first mentioned shaft meshing with the floating gear wheel, and means operated by the floating gear wheel for indicating the advance or retardation of spark producing instrumentalities of the distributor in comparison with the speed of rotation of the distributor.

WILBER HUGHES.